(12) United States Patent
Bertram et al.

(10) Patent No.: US 7,188,156 B2
(45) Date of Patent: Mar. 6, 2007

(54) SYSTEM, METHOD AND COMPUTER PROGRAM FOR PROVIDING A TIME MAP OF ROLLED-UP DATA

(75) Inventors: Randal Lee Bertram, Raleigh, NC (US); Dawn Ashley Comfort, Raleigh, NC (US); Frederick Scott Hunter Krauss, Raleigh, NC (US); James C. Cook, Georgetown, KY (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/392,654

(22) Filed: Mar. 20, 2003

(65) Prior Publication Data

US 2004/0199826 A1    Oct. 7, 2004

(51) Int. Cl.
G06F 13/00 (2006.01)
(52) U.S. Cl. .................. 709/219; 719/328; 345/736
(58) Field of Classification Search .............. 709/219, 709/223, 224; 719/328, 329; 345/736
See application file for complete search history.

(56) References Cited

U.S. PATENT DOCUMENTS

| | | | | |
|---|---|---|---|---|
| 5,093,794 | A | | 3/1992 | Howie et al. ............... 364/468 |
| 5,892,506 | A | * | 4/1999 | Hermanson ............... 715/500.1 |
| 6,064,984 | A | * | 5/2000 | Ferguson et al. ......... 705/36 R |
| 6,326,946 | B1 | * | 12/2001 | Moran et al. ............... 345/156 |
| 6,332,147 | B1 | * | 12/2001 | Moran et al. ............ 715/500.1 |
| 6,397,359 | B1 | | 5/2002 | Chandra et al. ............ 714/712 |
| 6,470,464 | B2 | | 10/2002 | Bertram et al. ............... 714/37 |
| 6,968,341 | B2 | * | 11/2005 | Hand et al. ................ 707/102 |
| 2003/0033296 | A1 | * | 2/2003 | Rothmuller et al. ............ 707/3 |
| 2003/0038831 | A1 | * | 2/2003 | Engelfriet ................. 345/719 |
| 2004/0168115 | A1 | * | 8/2004 | Bauernschmidt et al. ... 715/500 |

FOREIGN PATENT DOCUMENTS

JP    09-113308    2/1997

OTHER PUBLICATIONS

GPSlog GPS Acquisition Software, "http://www.navtechgps.com/supply/gpslog.asp", printed Feb. 6, 2003.
Brainstorm—Data Visualization, "http://neuroimage.usc.edu/brainstorm/DataPlot.html", printed Feb. 6, 2003.

* cited by examiner

Primary Examiner—Viet D. Vu
(74) Attorney, Agent, or Firm—Harrington & Smith, LLP (57) ABSTRACT

Disclosed are embodiments of a method, a system and a computer program product for selecting data to be presented in a report form. A selector window is displayed to a user, the selector window displaying periods of time for indicating those periods of time for which data is available. The periods of time are displayed as a stack of temporally aligned time lines that are each partitioned into time periods of different duration, where each partition of a given time line has a spatial extent that differs from the spatial extent of partitions of other time lines, with longer partitions encompassing a plurality of shorter partitions. In response to the user selecting a point on a time line, the method, system and computer program product displays a report of that data. The method, system and computer program product further display a partition within a time line to comprise a visual indicator to indicate the occurrence of at least one event of interest that occurred during the time that corresponds to that partition. The data may represent computer system performance metric data that includes rolled-up data, and an absence of a displayed partition indicates to the user that the corresponding data is not available.

32 Claims, 7 Drawing Sheets

SYSTEM, METHOD AND COMPUTER PROGRAM FOR PROVIDING A TIME MAP OF ROLLED-UP DATA

TECHNICAL FIELD

These teachings relate generally to graphical user interfaces (GUIs) for data processing systems and, more specifically, relate to methods and apparatus for displaying data to a user, where the data represents a historical record of past events.

BACKGROUND

In many data processing applications records are made of events, and these records are then stored in a database. A user may then query the database to obtain a visual display of the information relating to the stored records.

One type of database application that is of particular interest to this invention is one that measures and records data processing system performance. In some of these systems the data for a number of monitored computers is maintained in a central database. The data typically includes performance metrics, such as CPU Utilization, Disk Utilization, Memory Utilization, Input/Output (I/O) Wait Time, and other similar performance-related metrics.

It is often the case that data is stored with a higher resolution for more recent periods of time. For example, the metrics can be displayed for one day, but only for the past 30 days; and the metrics can be displayed for one week, but only for the past 52 weeks; and the metrics can be displayed for one month, but only for the past three years. This arrangement avoids a requirement to save data at a high resolution (e.g., once per day) for longer than is necessary, and thus conserves system memory. The underlying assumption in this type of data storage scheme is that long-term analysis will only be concerned with major trends, whereas short-term analysis will only be concerned with recent specific events and conditions. In this scheme the older data can be said to be "rolled-up", that is, averaged over longer periods of time (e.g., performance metrics for each day of a week are averaged into one performance metric for the entire week).

During use, a user will typically review a monthly report, and then attempt to view a particular week within the month. However, this will be effective only if the month of interest occurred within the past year. Likewise, a user viewing a weekly report may wish to view a particular day within a week of interest, but may find that the week of interest did not occur recently enough for the individual days to be available for viewing.

As such, a need exists for a user interface that enables a user to quickly and efficiently determine, at a glance, what time periods, such as months, weeks and days, are currently available to be viewed, and what relationships exist between the available time periods.

In addition, and in order to avoid the user having to generate and review many reports, a need exists to provide a user interface that enables a user to determine, at a glance, what months, weeks and days have data that indicate a problem, such as a system bottleneck or a system outage.

Representative U.S. patents that may be interest to this invention include the following.

U.S. Pat. No. 6,397,359 B1, "Methods, Systems and Computer Program Products for Scheduled Network Performance Testing", V. Chandra et al., describes a system to test network performance by defining test schedules to be implemented, and when test protocols should be executed. In this system it is said to not be necessary to continuously update test-related auto-thresholds, particularly if sufficient damping is provided, to insure stable operations of performance analysis and threshold crossing detection. Auto-thresholds may be adjusted for those connections which have auto-thresholds on a periodic basis, such as a nightly basis. This time period may be increased as greater amounts of prior data are obtained and are available for a given connection and threshold. As an example, for a connection and threshold having a full week or more of data, the auto-threshold may only be updated on a weekly basis, rather than on a nightly basis Commonly assigned U.S. Pat. No. 6,470,464, "System and Method for Predicting Computer System Performance and for Making Recommendations for Improving Its Performance", R. L. Bertram et al., describes a system and method of monitoring and analyzing the performance of a computer system and its components in a data processing network, and for proposing changes to the network to improve the performance. The system involves identifying undesirable conditions (sometimes called bottlenecks) in the system, determining which bottlenecks are the most severe in affecting the performance of the system, and proposing changes to the components of the system to improve performance of the network. This U.S. patent uses historical data and forecasting techniques to predict bottlenecks which have not yet occurred, but which can be expected, so that further bottlenecks can be projected, along with a prediction interval to indicate the confidence of the prediction. The further projections and the prediction interval are provided in a graph that is available to the user.

In addition, U.S. Pat. No. 5,093,794, "Job Scheduling System", G. R. Howie et al., describes a system to schedule jobs by the use of a time map that also indicates bottlenecks. JP09113308, "Measurement Data Processor", R. Hagiwara et al., describes, in the Abstract, a raw data file into which raw data, obtained by averaging measurement data, are written at one minute intervals; a daily report data file into which the sum value or average value of the raw data, per one hour, are written; a monthly report data file into which the sum value of the average value of daily report data, per one day, are written; and an annual report data file into which the sum value or average value of the monthly report data, per one year, are written. In response to a command to display a graph, a processor reads out the necessary data from a required file and displays the graph.

As should be apparent, prior to this invention the foregoing and other user interface needs have not been adequately fulfilled.

SUMMARY OF THE PREFERRED EMBODIMENTS

Disclosed herein are embodiments of a method, a system and a computer program product for selecting data to be presented in a report form. A selector window is displayed to a user, the selector window displaying periods of time for indicating those periods of time for which data is available. The periods of time are displayed as a stack of temporally aligned time lines that are each partitioned into time periods of different duration, where each partition of a given time line has a spatial extent that differs from the spatial extent of partitions of other time lines, with longer partitions encompassing a plurality of shorter partitions. In response to the user selecting a point on a time line, the method, system and computer program product displays a report of that data. The method, system and computer program product further display a partition within a time line to comprise a visual indicator to indicate the occurrence of at least one event of interest that occurred during the time that corresponds to that partition.

In a presently preferred, but non-limiting, embodiment of this invention the data represents computer system performance metric data that includes rolled-up data, and an absence of a displayed partition indicates to the user that the corresponding data is not available.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
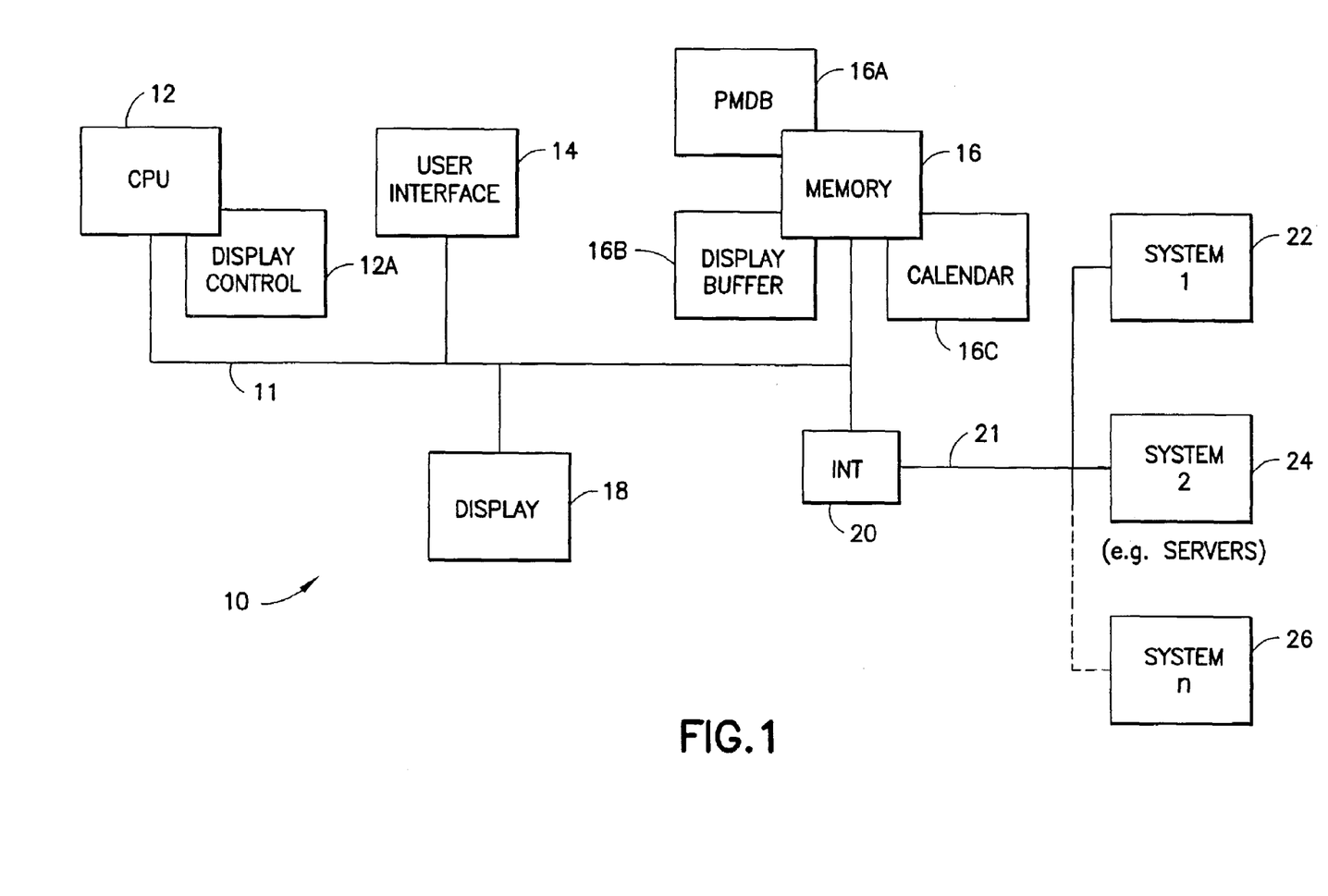
FIG. 1 is a simplified block diagram of a computer system that is suitable for practicing this invention.

FIG. 1 is a block diagram of a computer system 10 that is suitable for practicing this invention. The computer system 10 includes a central processor unit (CPU) 12 coupled to a system bus 11. Also coupled to the system bus 11 are a user interface 14, a system memory 16 and a display 18. The user can input information to the computer system 10 through the user interface 14, and the display 18 allows the user to view information from the system 10, for example, in graphical or text form (or, in some cases, in both forms), as described in further detail below. The display 18 may be considered to form a part of the user interface 14. An interface (INT) 20 may be coupled to a network 21 and thence to at least one other system, shown by example as System_1 22, System_2 24 and System_n 26. These other Systems 22, 24 and 26 could be other computer systems, servers, printers or other computer apparatus. In the presently preferred, but non-limiting embodiment performance metrics for the various Systems 22, 24 and 26, as well as for the system 10, are stored in a Performance Metrics Database (PMDB) 16A, shown for convenience as part of the system memory 16. In the context of this invention a database is considered to be any collection of data stored in any format, including data stored as a simple flat file, as well as data stored in a database as the term is conventionally used to refer to a data storage application. Applications software that is suitable for gathering and recording performance metrics can be of any suitable type. As one non-limiting example, reference can be had to the above-mentioned commonly assigned U.S. Pat. No. 6,470,464, "System and Method for Predicting Computer System Performance and for Making Recommendations for Improving Its Performance", R. L. Bertram et al., incorporated by reference herein insofar as there is no conflict with the teachings of this invention.

The CPU 12 is assumed for the purposes of this invention to include a display and report controller 12A that operates with a display buffer 16A to implement the method of this invention. Further in this regard, the memory 16 may contain one or more computer programs provided on a computer readable media for directing the operation of the display and report controller 12A to execute the method of this invention. The computer program can be embodied on or in any suitable tangible media, such as a disk and/or semiconductor memory, and may also be referred to herein as a computer program product.

A user of the computer system 10 may wish to view the performance of the computer system 10 and/or the performance of one of the other systems 22, 24, 26 on display 18. The performance may be of concern to a system or network administrator, for example, in managing the performance of the overall data processing system and network, including network servers such as those embodied in Systems 22, 24, 26. Applications that reside on the user's system 10 (but are not shown) allow a query to receive the performance data.

Figure 2:
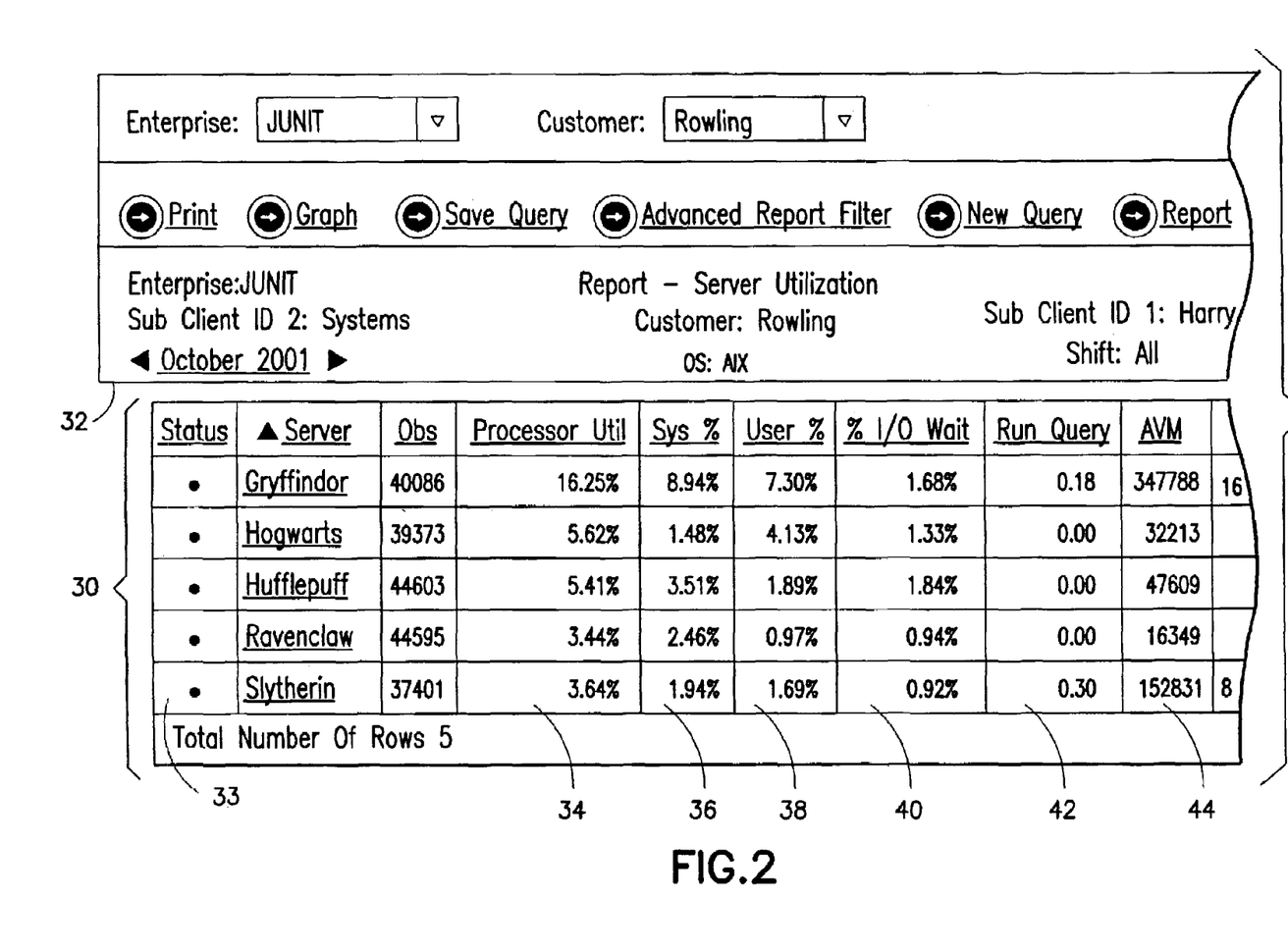
FIG. 2 illustrates an exemplary report window that shows various performance metrics for a plurality of servers.

FIG. 2 shows an exemplary display window containing a report 30 of performance metrics for a user specified date, in this case for one month. The date (e.g., October 2001) is shown displayed in a Date field 32. In the illustrated report 30 a total of five servers are listed in five rows, with the performance metrics data listed for each in column fashion. The performance metrics can include, as non-limiting examples only, Processor Utilization 34, System % 36, User % 38, I/O Wait % 40, Run Queue 42 and Active Virtual Memory (AVM) 44. The AVM performance metric 44 represents an average amount of Active Virtual Memory in use throughout the data collection period, more specifically the number of 4 Kb blocks of virtual memory (referred to as pages) that are in use. Various buttons (e.g., Print, Graph, etc.) and information windows (e.g., Enterprise, Customer, etc.) may also be displayed as desired, however these are not particularly germane to an understanding of this invention.

Figure 3A:
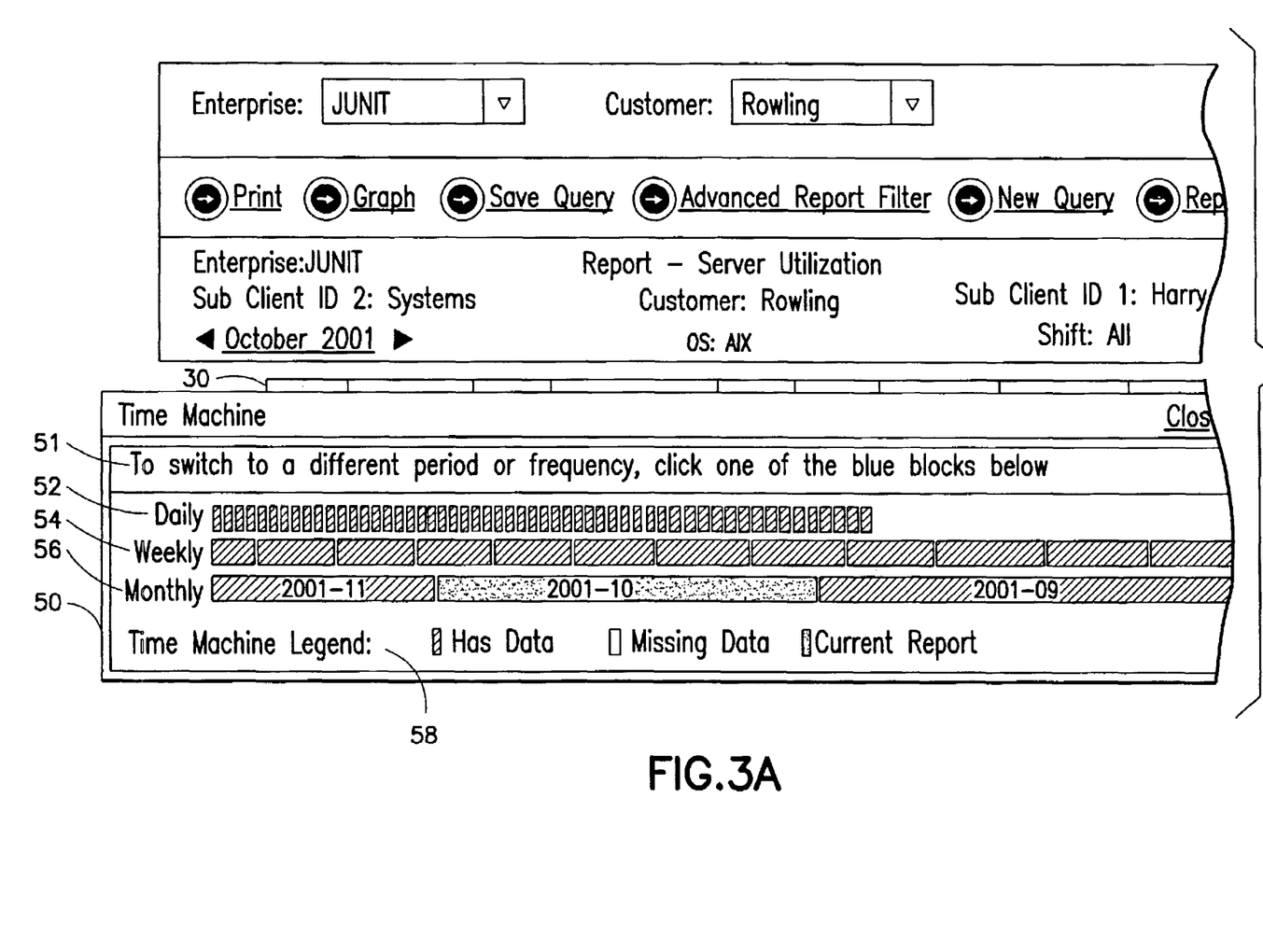
FIG. 3A shows a time line window in accordance with an aspect of this invention.

In accordance with an aspect of this invention, and referring to FIG. 3A, by the user selecting the Date field 32, such as by positioning a cursor on the Date field 32 and by clicking on or otherwise designating the Date field 32, the display and report controller 12A operates to cause a new display window to appear over the report 30 in the display window. The new display window is referred to herein as a time map window 50, and may also be referred to for convenience as a "Time Machine" window.

Figure 3B:
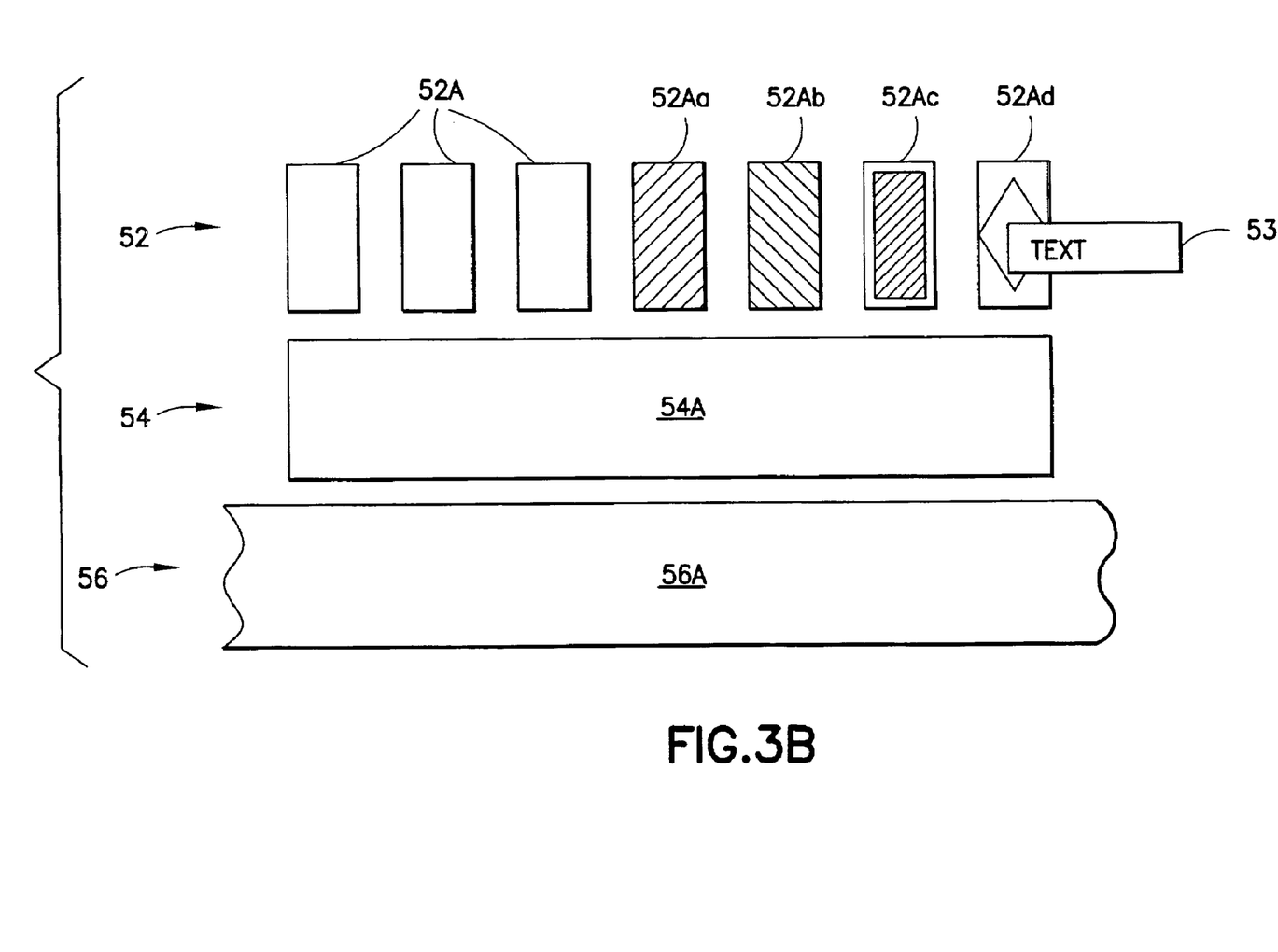
FIG. 3B shows a detail of the time line window of FIG. 3A, and also shows various examples of information bearing time icons.

In accordance with an aspect of this invention, the time map window 50 is organized as a stack of temporally aligned time lines that are divided into a plurality of partitions, represented by displayable icons, shown more clearly as rectangular bars in FIG. 3B, each representing a different temporal resolution. In the illustrated embodiment a first time line 52 contains a first sequence of icons 52A, where each icon 52A represents one day, a second time line 54 contains a second sequence of icons 54A, where each icon 54A represents one week, and a third time line 56 contains a third sequence of icons 56A, where each icon 56A represents one month. More or less than three time lines 52, 54, 56 may be present, such as one for hours in a day and/or one representing years. Also by example, the monthly time line 56 may be eliminated and replaced with a yearly time line (not shown), thereby representing time as years and weeks within the year (e.g., Week_1, Week_2, Week_3, etc.).

Further by example, another embodiment may employ any combination of some or all of minutes, hours, days, weeks, months, years and decades. Another embodiment may use irregular time periods, such as weekends/weekdays which have the ratio of 2-5-2-5-2, etc.

Regardless of the time line convention used, in response to a user selecting a point on a time line within a given resolution (e.g., the time line 52 for days), the report 30 of the corresponding performance metrics data for the selected time is displayed.

The time lines 52, 54 and 56 may be said to be organized as a "stack" because they are displayed in a closely adjacent manner one to another so as to facilitate the user's perception of the temporal relationships between the icons in each of the time lines.

It is instructive to note in FIG. 3A that no individual day icons 52A are shown after the fourth day of September 2001. This clearly indicates to the user that the days following the fourth day of September have been "rolled-up", i.e., averaged into their respective weekly (and monthly) performance metrics data and removed from the PMDB 16A. Thus, the user is clearly notified, at a glance, that the performance metrics data for these individual days is not available for viewing, thereby saving the user the effort attempting to locate and view the corresponding performance metrics data.

In the preferred embodiment the time map window 50 can be repositioned by the user on the display screen 18 so that the underlying report 30 can also be simultaneously viewed. In the time map window 50 the user can switch the report 30 to any day, week or month by clicking on the corresponding displayed icon 52A, 54A, 56A, respectively.

Figure 4:
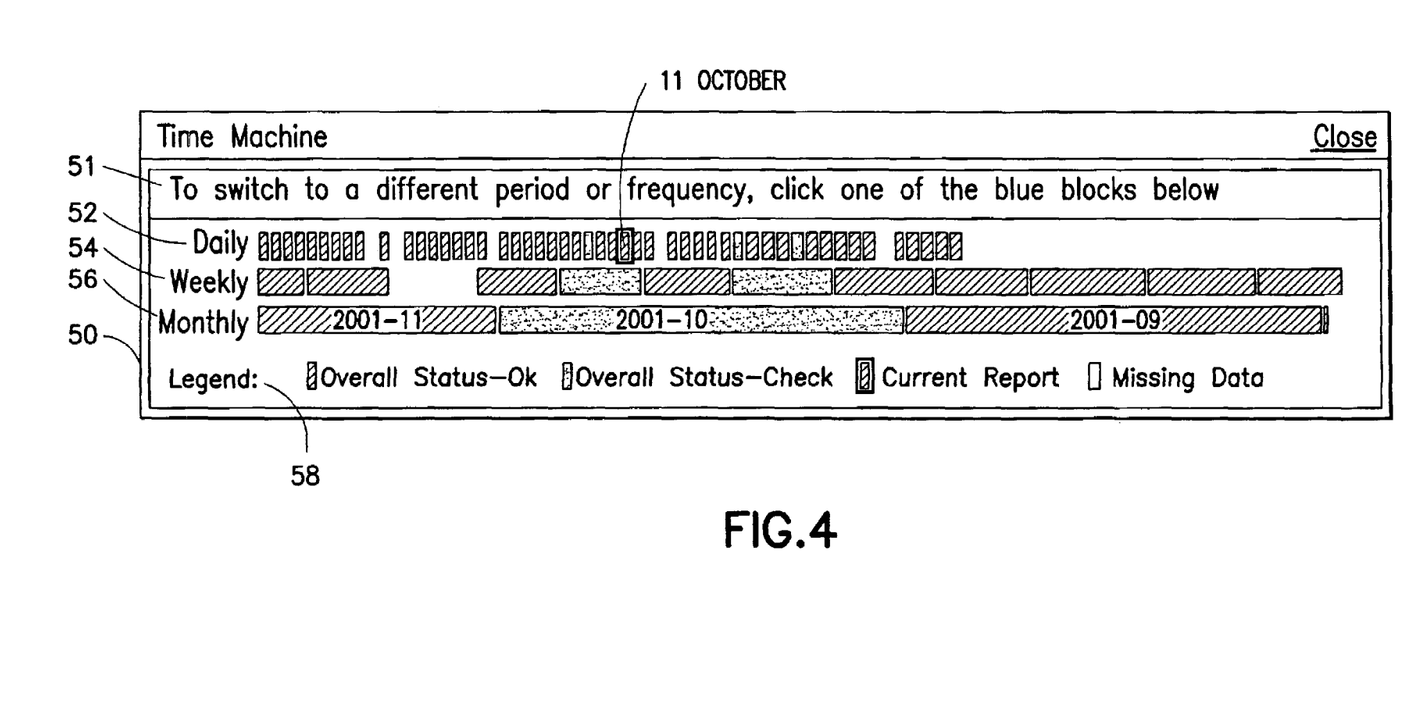
FIG. 4 is another view of the time line window of FIGS. 3A, and shows an example of the use of certain of the information-bearing icons introduced in FIG. 3B.

The time map window 50 preferably also displays other pertinent information, such as user instructions 51, and may contain a legend bar 58 for providing information regarding the displayed information, better seen in FIG. 4.

Note in the non-limiting example of FIG. 3A that the time map window 50 is centered on the date from the Current Report, or October 2001 in this case. However, in other embodiments, such as those that do not employ horizontal scrolling, or horizontal compression, of the time lines 52, 54, 56, the current, selected date may not be centered in the time map window 50. That is, the currently selected date could appear at either side of the center of the displayed icons.

The month time line 52 partition that corresponds to October 2001 is preferably displayed to be visually contrasting to (e.g., by the use of a different color) the month partitions on each side. In the time line 54 (Weeks) it can be seen that there were three full weeks and two partial weeks in October 2001. That is, the vertical spatial alignment of the icons 52A, 54A, 56A corresponds to the actual (calendar) temporal alignment of the respective time periods.

Depending on the size of the display 18, and the amount of screen space allocated for the time line window 50, only certain of the icons may have room to display text, shown by example in FIG. 3A as the year and month information displayed in the month icon 56A (e.g., 2001–10). However, fly-over text 53, shown in FIG. 3B, can be displayed to indicate the date (and/or some other information, such as the nature of the event(s) represented by the icon) if the user points to a day icon 52A or a week icon 54A.

Figure 3C:
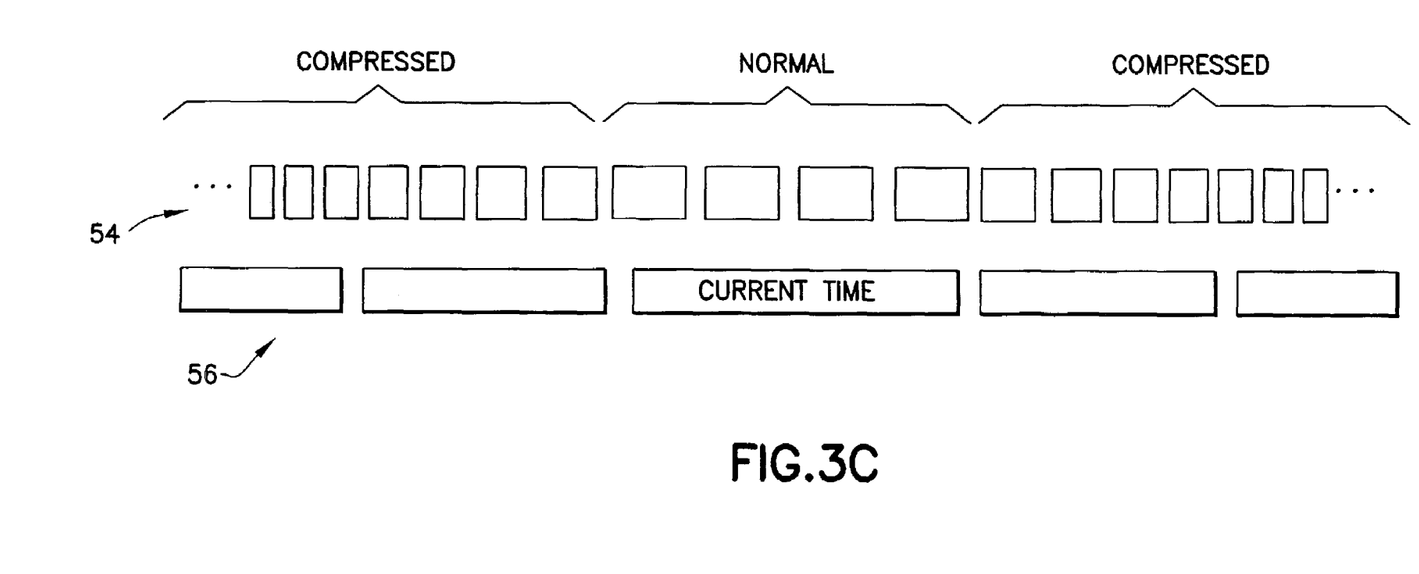
FIG. 3C shows an embodiment of the time line window where the horizontal extent of icons are progressively compressed in a direction away from a current report date.

There may be more weeks and months than will fit into the time line window 50. In this case the additional weeks or months can be viewed by horizontally scrolling them. Alternatively, or in conjunction with scrolling, the additional weeks and months (and possibly days) can be displayed in a horizontally compressed fashion towards the left and/or right sides of the time line window 50. FIG. 3C shows an example of this optional horizontal compression. In this case the icon(s) corresponding to the date that is currently of most interest can be displayed in the center of the time line window 50 as full size (normal display), and those further away in time (both past and future) can be displayed in a progressively smaller, compressed fashion (e.g., with a "fish-eye lens effect").

When viewing the display 18 the user may desire to see at what times system outages, performance bottlenecks, and other events of interest occurred. In conventional practice the user may be required to manually view a number of reports to locate these events of interest. In accordance with a further aspect of this invention, however, the user can be presented with a clear indication of when such events of interest occurred, e.g., during what month, weeks and/or days a system outage occurred.

Referring to FIG. 3B, it can be seen that certain of the day icons 52A are displayed to have a visually distinct color and/or a graphical or symbolic pattern that indicates an occurrence of some event of interest (see the icons 52A$a$, 52A$b$, 52A$c$ and 52A$d$). This beneficially gives the user an overview of the performance metrics data in the performance metrics database 16A. The type of event or events of interest may be selected by the user. For example, one user may be interested in only seeing system outages, while another is interested in seeing system outages as well as those periods when the I/O Wait Queue exceeded some threshold value, which may also be user selectable. By using this type of display the user is enabled to go directly to the time(s) when the event or events of interest occurred, again by pointing to an icon having the visually distinct display format and then viewing the corresponding performance metrics report 30.

It should be noted that an event of particular interest can be if a certain metric or metrics fall above or below a threshold value. For example, it is common for system analysts to flag performance data that is higher or lower than a predefined threshold. Also, system analysts may often flag performance data /by using a combination of several performance metrics and thresholds. For example, and referring to FIG. 2, the Status column 33 indicates whether any of a server's key metrics are outside of optimal boundaries. The same status information may be indicated in the time map window 50, such as by the use of the icon 52A$d$.

In the example of FIG. 4, and considering also the Legend 58, the current report date (11 October) is indicated by the day icon having the white outline, see icon 52A$c$ in FIG. 3B, missing data is indicated by a date icon 52A that is clear (white), while performance metrics data that the user should check is indicated by a solid black day icon. In this regard it should be noted that there are any of a number of reasons why data may be missing from or unavailable in the PMDB 16A. As non-limiting examples, data could be missing or unavailable, due to roll-up, a system outage, a storage error, or because of a manual deletion. In the example of FIG. 4, then, there is one day (14 October) where there is missing performance metrics data in the PMDB 16A, for whatever reason, and four days that the user should check. Note that the presence of at least one solid black indicated day results in the corresponding solid black colored week icon 54A, as well as in the corresponding solid black colored monthly icon 56A. The Overall Status-Check solid black icon may correspond to a day when some user-specified event occurred, such as a system outage, or some combination of user-specified events. Alternatively, the event type(s) marked to be checked may not be user-specified, but instead may be system-specified (default) event types. A combination of user-specified and system-specified event types can also be employed. The fly-over text 53, shown in FIG. 3B, can also be used to provide information related to a displayed Overall Status-Check icon, such as the type or types of problems that occurred during the corresponding time period.

Note that the underlying report 30 may show a group of servers (e.g., servers 22, 24, 26) or an individual server (e.g., only server 24). For a group of servers, the status appearing in the icon(s) of the time line window 50 can indicate that at least one of the servers of the group of servers experienced some problem. After generating the report, the user may then click on one specific server of the group to examine the performance metrics of that server in detail. For an individual server, the data is plotted over time in the report 30, and the status displayed in the time line window 50 indicates that a problem exists in the performance metrics plotted for that particular server.

At this point those skilled in the art should appreciate that this invention both addresses and fulfills the need of providing a user interface that enables the user to quickly and efficiently determine, at a glance, what months, weeks and days have data that is currently available to be viewed, and what relationships exist between the available months, weeks and days. The invention also addresses and fulfills the need of providing a user interface that enables the user to determine at a glance what months, weeks and days have data that indicates an occurrence of a specific event or events, such as a system bottleneck and/or a system outage.

Figure 5:
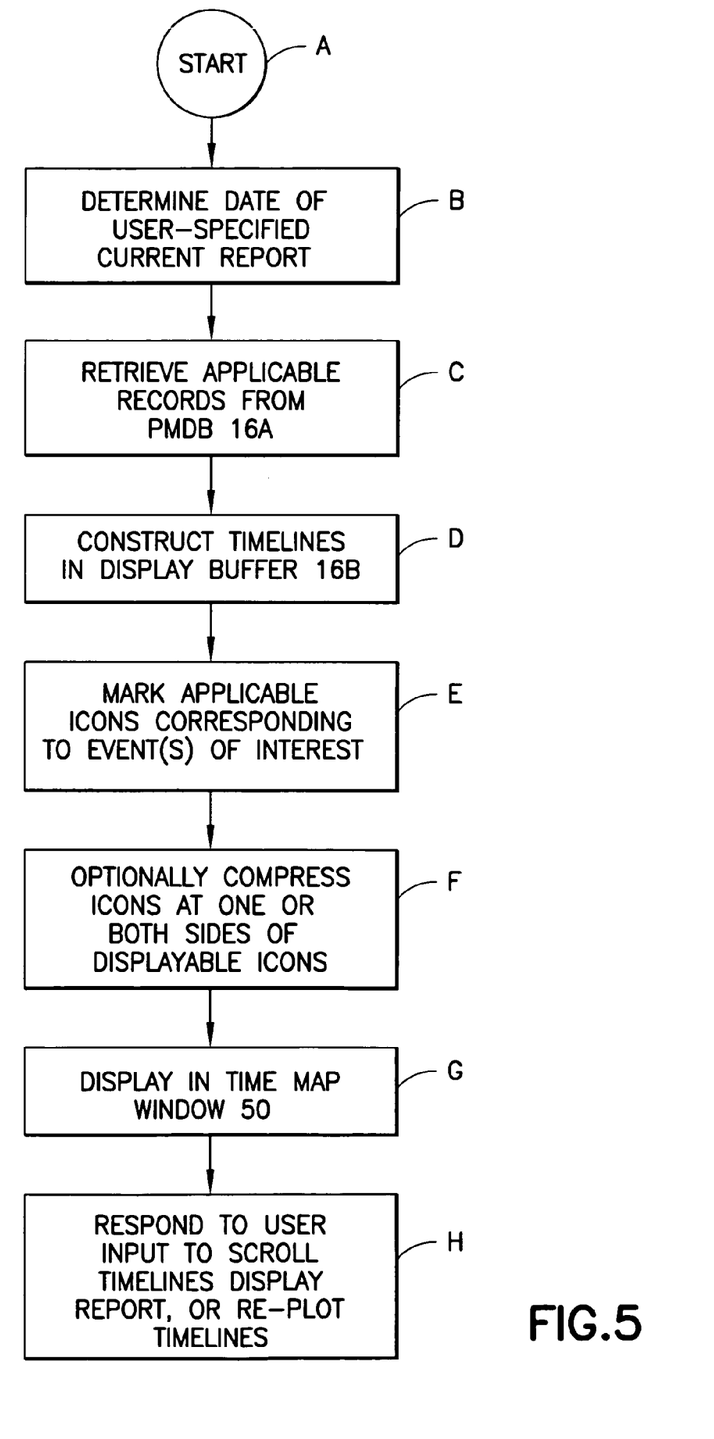
FIG. 5 is a logic flow diagram that illustrates a method for constructing the time line window.

Reference is now made to FIG. 5 for a description of a method executed by the display and report controller 12A for constructing the time line window 50, and for implementing related aspects of this invention. The method starts at Block A, and at Block B the display and report controller 12A determines the date of a user-specified current report from the Date field 32, such as October 2001 as in the examples of FIGS. 2 and 3A. At Block C the display and report controller 12A retrieves the applicable performance metric records from the PMDB 16A. This involves retrieving records for the specific user-specified report date, as well as records for periods of time both preceding and following the user specified report date. For example, the performance metrics records can be retrieved for the user-specified month, as well as for the preceding and following one or two months (if available). In Block D the display and report controller 12A constructs the time lines 52, 54 and 56 in the display buffer 16B. This involves mapping the individual days to day icons 52A, assuming that the days in question have not been rolled-up and the corresponding records can be found in the PMDB 16A, and mapping the summary information for the applicable weeks and months to week icons 54A and month icons 56A. During this process the display and report controller 12A preferably consults a stored calendar 16C in order to determine the correct horizontal alignment between the day, week and month icons for the date range of interest (possibly but not necessarily centered on the user-specified report date). At Block E the display and report controller 12A marks those day icons 52A that correspond to performance metrics records that indicate the occurrence of an event or events of interest to the user, or that correspond to system default events (e.g., the occurrence of an outage may be considered to be a default event that is always marked in the corresponding day icon). If a null performance metric record is found for a particular day then a blank day icon 52A can be provided to indicate missing data. The same procedure is then followed for the icons of the remaining time lines 54 and 56, i.e., it is preferred to process each time line independently as, for example, the weekly data is a roll-up of the daily data, which may or may not have been retained in the PMDB 16A. The Legend 58 may then constructed to reflect the events of interest that may or may not have been indicated in the day, week and month icons, depending on the content of the performance metric records for the applicable time period. Block F shows the optional horizontal compression of the icons 52A, 54A and 56A at one or both sides of the displayable icons, as was discussed above with reference to FIG. 3C. Having thus suitably prepared the content of the time map window 50 in the display buffer 16B, the display and report controller 12A writes the buffer contents to the display 18, resulting in the display shown to the user in FIGS. 3A or 4. Block H represents the further action of the display and report controller 12A in responding o the user. This can involve, as was discussed above, displaying the performance metrics report for a time period selected by the user (e.g., for 11 Oct. 2001 as in the example of FIG. 4), or is playing a date or other text in the fly-over text window 53 shown in FIG. 3B, or re-plotting the content of the time map window 50 due to horizontal scrolling of the time map window contents, or any other activity desired by the user.

The foregoing description has been a full and informative description of the best method and system presently contemplated for carrying out the present invention which is known to the inventors at the time of filing the patent application. Of course, many modifications and adaptations will be apparent to those skilled in the relevant arts in view of the description when read in conjunction with the accompanying drawings and the appended claims. As but one example, the icons of the time line window could be arranged in a vertical fashion. As another example, the icons need not have rectangular shapes as illustrated. As another example, the time line window as described above is not restricted for use in a system that stores and reports performance metrics for data processing systems and components, such as network-connected servers and the like, but instead may find applicability in many types of database systems where a historical record of data and events is stored, including billing systems, human resources systems, meteorological systems and other types of database systems. It should further be noted that the use of this invention is not restricted to only historical data, but can be employed as well to display projected or predicted and/or planned future data. While the system and method described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, since this invention is defined by the claims which follow.

What is claimed is:

1. A computer program product embodied on a tangible computer readable media for causing a computer to execute a method to enabled a user to select data to be presented in a report form, the method comprising:

displaying periods of time for indicating those periods of time for which data is available, the periods of time being displayed as a stack of temporally aligned time lines that are each partitioned into time periods of different duration, where each partition of a given time line has a spatial extent that differs from the spatial extent of partitions of other time lines, with longer partitions encompassing a plurality of shorter partitions; and in response to the user selecting a point on a time line, displaying a report of that data.

2. A computer program product as in claim 1, where the method further comprises displaying a partition within a time line to comprise a visual indicator to indicate the occurrence of at least one event of interest that occurred during the time that corresponds to that partition.

3. A computer program product as in claim 1, where at least some of the data is comprised of rolled-up data, and where one of an absence of a displayed partition, or a displayed partition having a distinctive visual characteristic, indicates to the user that the corresponding data is not available.

4. A computer program product as in claim 1, where the data comprises computer system performance metric data.

5. A computer program product as in claim 2, where the data comprises computer system performance metric data, and where an event of interest comprises data that for some reason is not available.

6. A computer program product as in claim 2, where the data comprises computer system performance metric data, and where an event of interest comprises a bottleneck.

7. A computer program product as in claim 2, where the data comprises computer system performance metric data, and where an event of interest comprises an occurrence of a value of at least one performance metric exceeding or falling below a threshold value.

8. A computer program product as in claim 1, where the method further comprises displaying a partition within a time line to comprise a visual indicator to indicate that data is missing during the time that corresponds to that partition.

9. A computer program product as in claim 1, where partitions are visually represented by display icons, where a time corresponding to the currently selected point on the time line is displayed with display icons disposed in a centrally disposed location, and where display icons corresponding to at least one of earlier or later times, are displayed in a spatially compressed manner.

10. A computer program product as in claim 1, where partitions are visually represented by display icons having a generally rectangular shape.

11. A computer program product as in claim 1, where the time periods comprise at least some of minutes, hours, days, weeks, months, years and decades.

12. A computer program product as in claim 1, where the method further comprises displaying a partition within a time line to comprise a visual indicator to indicate the occurrence of at least one event of interest that occurred during the time that corresponds to that partition, and displaying a partition in an adjacent time line with the visual indicator to indicate the occurrence of the at least one event of interest.

13. A computer program product as in claim 1, where the method further comprises, responsive to a user selecting a partition, displaying text that is descriptive of the selected partition.

14. A computer program product as in claim 1, where the data comprises historical data.

15. A computer program product as in claim 1, where the data comprises historical data and at least one of projected, predicted and planned future data.

16. A data processing system comprising a memory for storing data and a user interface for enabling a user to select data from the stored data to be presented in a report form, further comprising a display controller, coupled to said user interface and to said stored data, for displaying with the user interface periods of time for indicating those periods of time for which data is available, the periods of time being displayed as a stack of temporally aligned time lines that are each partitioned into time periods of different duration, where each partition of a given time line has a spatial extent that differs from the spatial extent of partitions of other time lines, with longer partitions encompassing a plurality of shorter partitions, and said display controller being responsive to the user selecting a point on a time line for displaying a report that is descriptive of the corresponding stored data.

17. A data processing system as in claim 16, where said display controller is responsive to a content of said stored data for displaying a partition within a time line to comprise a visual indicator to indicate the occurrence of at least one event of interest that occurred during the time that corresponds to that partition.

18. A data processing system as in claim 16, where at least some of the data is comprised of rolled-up data, and where one of an absence of a displayed partition, or a displayed partition having a distinctive visual characteristic, indicates to the user that the corresponding data is not available.

19. A data processing system as in claim 16, where the data comprises computer system performance metric data.

20. A data processing system as in claim 17, where the data comprises computer system performance metric data, and where an event of interest comprises data that for some reason is not available.

21. A data processing system as in claim 17, where the data comprises computer system performance metric data, and where an event of interest comprises a bottleneck.

22. A data processing system as in claim 17, where the data comprises computer system performance metric data, and where an event of interest comprises an occurrence of a value of at least one performance metric exceeding or falling below a threshold value.

23. A data processing system as in claim 16, where the method further comprises displaying a partition within a time line to comprise a visual indicator to indicate that data is missing during the time that corresponds to that partition.

24. A data processing system as in claim 16, where partitions are visually represented by display icons, where a time corresponding to the currently selected point on the time line is displayed with display icons disposed in a centrally disposed location, and where display icons corresponding to at least one of earlier or later times, are displayed in a spatially compressed manner.

25. A data processing system as in claim 16, where partitions are visually represented by display icons having a generally rectangular shape.

26. A data processing system as in claim 16, where said time periods comprise at least some of minutes, hours, days, weeks, months, years and decades.

27. A data processing system as in claim 16, where said display controller is responsive to a content of said stored data for displaying a partition within a time line to comprise a visual indicator to indicate the occurrence of at least one event of interest that occurred during the time that corresponds to that partition, and displaying a partition in an adjacent time line with the visual indicator to indicate the occurrence of the at least one event of interest.

28. A data processing system as in claim 16, where the data comprises historical data.

29. A data processing system as in claim 16, where the data comprises historical data and at least one of projected, predicted and planned future data.

30. A computer executed method to enable a user to select computer system performance metric data to be presented in a report form, the method comprising displaying periods of time for indicating those periods of time for which performance metric data is available, the periods of time being displayed as a stack of temporally aligned time lines that are each partitioned into time periods of different duration, where each partition of a given time line has a spatial extent that differs from the spatial extent of partitions of other time lines, with longer partitions encompassing a plurality of shorter partitions, and in response to the user selecting a point on a time line, displaying a report descriptive of corresponding performance metric data, where at least some of the performance metric data is comprised of rolled-up data, and where an absence of a displayed partition indicates to the user that the corresponding performance metric data is not available, where the method further comprises displaying a partition within a time line to comprise a visual indicator to indicate an occurrence of at least one event of interest during the time that corresponds to that partition.

31. A system for presenting computer system performance metric data in a report form, said system comprising means for determining periods of time for which performance metric data is available and unavailable, where at least some of the performance metric data is comprised of rolled-up data, means for displaying the periods of time as a stack of temporally aligned time lines that are each partitioned into time periods of different duration, where each partition of a given time line has a spatial extent that differs from the spatial extent of partitions of other time lines, with longer partitions encompassing a plurality of shorter partitions, said system further comprising means, operating in response to receiving a signal from a user interface means that indicate a point on a displayed time line, for outputting a report descriptive of performance metric data associated with the indicated point on the time line, said display means further displaying at least one partition within a time line to comprise a visual indicator to indicate an occurrence of at least one event of interest during the time that corresponds to the at least one partition.

32. A data processing system as in claim 16, where said display controller is responsive to a user selecting a partition, for displaying text that is descriptive of the selected partition.

* * * * *